Feb. 8, 1966  P. M. TOMARO, JR  3,234,418

SYNCHRONOUS MOTOR

Filed June 22, 1962  3 Sheets-Sheet 1

INVENTOR.
PATRICK M. TOMARO JR.
BY
Nolte & Nolte
ATTORNEYS

INVENTOR.
PATRICK M. TOMARO JR.
BY
Nolte & Nolte
ATTORNEYS

Feb. 8, 1966 P. M. TOMARO, JR 3,234,418
SYNCHRONOUS MOTOR
Filed June 22, 1962 3 Sheets-Sheet 3
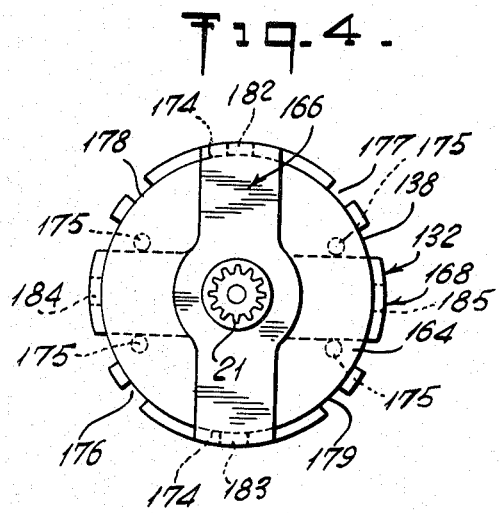
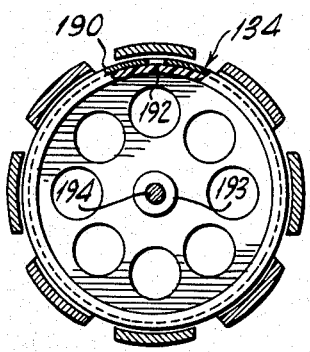
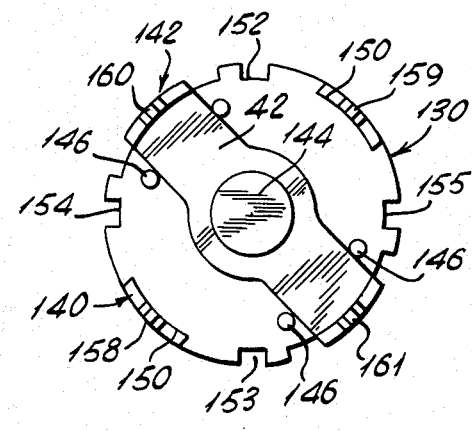
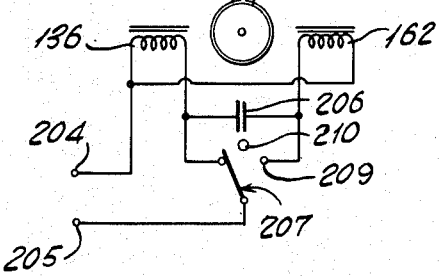
INVENTOR.
PATRICK M. TOMARO JR.
BY
Nolte & Nolte
ATTORNEYS

United States Patent Office 3,234,418
Patented Feb. 8, 1966

3,234,418
SYNCHRONOUS MOTOR
Patrick M. Tomaro, Jr., Maplewood, N.J., assignor, by mesne assignments, to Walter E. Heller & Company, Inc., New York, N.Y., a corporation of Delaware
Filed June 22, 1962, Ser. No. 204,371
1 Claim. (Cl. 310—164)

This invention relates to miniaturized motors. More particularly, this invention relates to an interfitting stator construction for use with a small synchronous motor.

It is an object of this invention to provide a simplified, self-starting synchronous motor.

Another object is to provide an interfitting stator construction which will facilitate the construction of small, two stator dynamos.

Still another object is to provide an economical and reliable two-phase hysteresis motor.

Briefly, the invention may pertain to a reversible, two-phase hysteresis motor having a rotor positioned between two oppositely disposed stator sections. Each stator includes a coil wound around a spool-like coil form and a pair of U-shaped pole pieces extending toward the opposite stator. Separate stators are necessary to enable rotation of the rotor in both directions. The adjacent ends of the coil forms include notches which are adapted to receive the ends of the pole pieces of the other. The construction is such that the pole pieces surround the rotor, adjacent pole pieces being associated with opposite coils, so that when the coils are properly energized, a rotating flux field is established to cause rotation of the rotor in a known manner.

Figure 1:
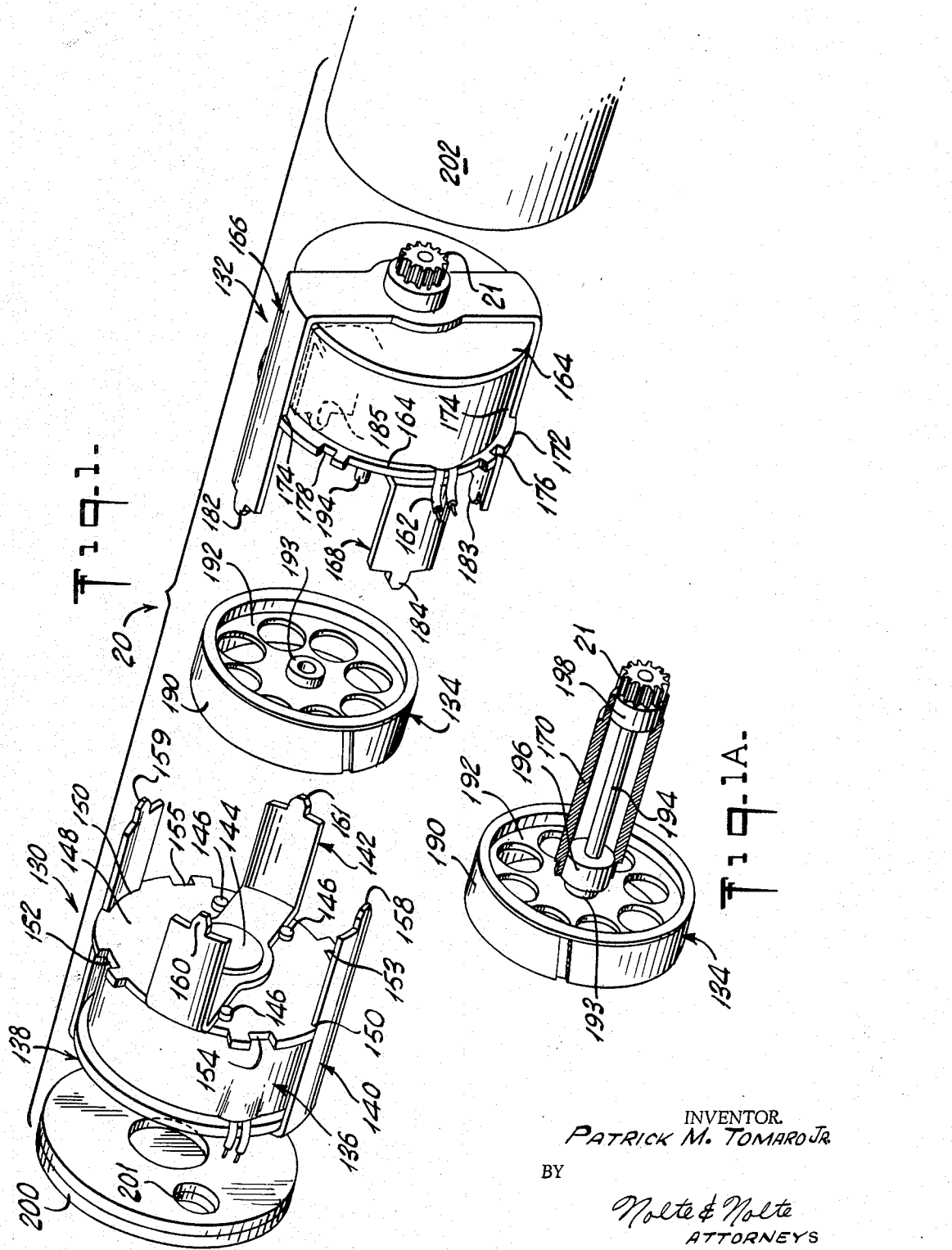
Figures 2, 3:
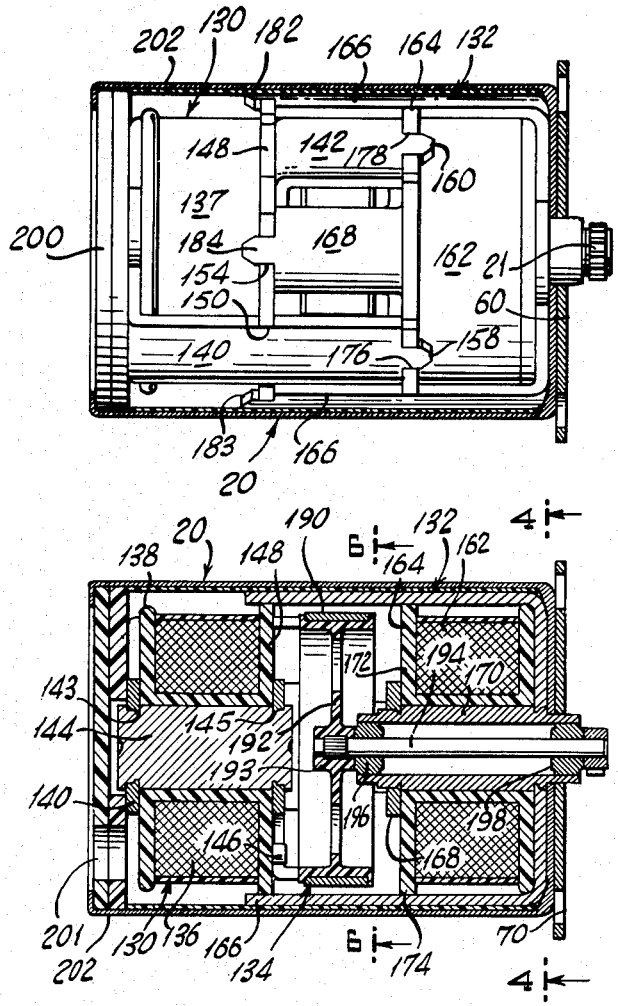

The manner in which the objects of the invention are accomplished will become more apparent with reference to the following specification and drawings, wherein:

FIG. 1 represents an exploded view of the motor according to the invention.
FIG. 1a illustrates the rotor construction.
FIG. 2 is a side view of the motor.
FIG. 3 is a sectional side view of the motor.
FIG. 4 is a top view of one of the stator sections.
FIG. 5 is a bottom view of the other stator section.
FIG. 6 is a sectional view along the line 6—6 of FIG. 3 showing the rotor construction.
FIG. 7 is a schematic diagram of a circuit which may be used to energize the coils of the motor.

With reference to FIGS. 1–3, the motor is indicated generally at 20. The motor may be of the reversible, hysteresis type which, per se, is known in the art. Such motors have particular utility in remote control circuits in which it is necessary to rotate a small shaft, and in other applications wherein it is desired to move a relatively light load. The motors are generally connected to a gear reduction assembly to reduce the speed of rotation of the rotor to practical levels. For this purpose, motor 20 is provided with an output gear 21 which is secured to the rotor shaft and adapted to drive the input gear of the gear reduction assembly.

The motor includes a first stator section 130, a second stator section 132, and a rotor 134 rotatably postioned between the two stator sections. Stator section 130 includes a coil 136 which is held in a spool-like coil form 138 and covered with a protective tape 137. A long U-shaped pole piece 140 is secured to the outer end of coil form 138, and a short U-shaped pole piece 142 is secured to the surface of inner disc 148 of coil form 138, and displaced ninety degrees with respect to pole piece 140. A core 144, made of a magnetic material, passes through the center of coil form 138 and through pole pieces 140 and 142. Core 144 includes annular notches 143 and 145, as shown in FIG. 3, to secure pole pieces 140 and 142, respectively, to the opposite ends of the coil form. Inner disc 148 of coil form 138 may include a plurality of projections 146 to prevent rotation of short pole piece 142 from its proper position. Disc 148 additionally includes four notches 152, 153, 154 and 155 for receiving the ends of the pole pieces of second stator section 132 in a manner to be described. In addition, the outer rim of disc 148 includes two cut-out areas 150, through which the ends of pole piece 140 pass to prevent rotary displacement thereof. The ends of both the long and short pole pieces extend toward stator section 132 and lie in the same plane. The ends of pole piece 140 include tabs 158 and 159, respectively, while the ends of pole piece 142 include tabs 160 and 161, respectively.

The second stator section is similar in construction to the first stator section and includes a coil 162 mounted in a coil form 164. A long pole piece 166 is secured to the outer surface of the coil form 164, and a short pole piece 168 is secured to the surface of inner disc 172 of the coil form. A hollow core 170 passes through the center of coil form 164 and includes annular notches for securing the pole pieces in the same manner described above with reference to the first stator section. Notches 174 in the outer rim of inner disc 172 prevent rotary displacement of long pole piece 166 while a plurality of projections 175 (FIG. 4) identical to projections 146 of the first stator section, prevent rotary displacement of short pole piece 168. The outer rim of inner disc 172 includes notches 176, 177, 178 and 179 for receiving the pole pieces of the first stator section, while pole pieces 166 and 168 are provided with tabs 182, 183 and 184, 185 which may be inserted into notches 152, 153, 154 and 155, respectively, of inner disc 148 of first stator section 130.

Rotor 134 is positioned between inner surface 148 of coil form 138 and inner surface 172 of coil form 164. As most clearly shown in FIGS. 1A and 6, the rotor includes a rotor ring 190 made of a high hysteresis material secured to the outer circumference of a wheel-like plastic support member 192. A rotor shaft 194 passes through the hub 193 of support member 192. A pair of low friction bearings 196 and 198 are received in the extremities of hollow core 170. The rotor shaft 194 is rotatably supported in bearings 196 and 198 and the gear wheel 21 is secured to the outer extremity of shaft 194. The output gear 21 extends slightly beyond the casing of the motor to permit output power to be taken therefrom.

To assemble the motor, rotor 134 is suitably journaled in core 170 of stator section 132. The tabs of the pole pieces of each stator are then inserted into their respective securing notches in the inner disc of the opposing stator section. In other words, notches 182, 183, 184 and 185 are inserted into notches 152, 153, 154 and 155, respectively, while tabs 158, 159, 160 and 161 are inserted into notches 176, 177, 178 and 179, respectively. The ends of the pole pieces of each stator section are thus positioned between adjacent ends of the long and short pole pieces of the other stator section. Hence, when the two stator sections are assembled, the pole pieces will surround the rotor as shown in FIG. 6 so that a rotating flux field will be produced when the two coils are energized with out-of-phase voltages, causing the rotor to rotate.

In the final packaging step, the motor is provided with a bottom plate 200 including aperture 201 for the coil leads, and the entire structure may then be inserted into a cylindrical casing 202 so that only the extremity of core 170 and output gear 21 extend therefrom.

The theory of operation of these motors is well known and need not be described. The electrical control circuit which determines the direction of rotation of the motor is conventional and illustrated in FIG. 7, in which a source of alternating current is available at terminals 204 and 205. A capacitor 206 delays the electrical voltage applied to one coil with respect to the voltage applied to the other. A three-position switch 207 is used to reverse the direction of the motor. With switch 207 in the position shown in FIG. 7, the voltage is applied directly to coil 136 while the delayed voltage is applied to coil 162, and the rotor will rotate in a given direction. If switch 207 is moved to contact 209, the voltage applied to coil 136 is then delayed with respect to the voltage applied to coil 162, in which case the rotor will rotate in the other direction. The motor may be turned off by placing switch 207 at position 210 in which case there will be no voltage across the coils.

Although a specific embodiment of the invention has been disclosed, many modifications thereof will be obvious to one skilled in the art, and the invention should not be limited except as defined in the following claim.

I claim:

A two-phase synchronous motor comprising two oppositely disposed coils, a rotor situated between said coils, a spool-like coil form for each of said coils, said coil forms being disposed in end to end relationship, a core member extending through the center of each of said coil forms, and pole piece members connected to each of the ends of said coil forms and extending toward the opposite coil forms, said pole piece members comprising U-shaped metallic strips secured to opposite ends of each of said cores, the strips at opposite ends of each core being displaced ninety degrees apart, the ends of the pole piece members associated with a given coil including small tabs lying in the same plane, said pole piece members being situated so as to produce a rotating flux field in proximity to said rotor when said coils are energized with out-of-phase voltages, the rim of the interior end of each coil form closest to the opposite coil form including first notches for receiving and securing the tabs of the pole pieces associated with said opposite coil form, said rim of each coil form including cutout areas for receiving portions of the pole piece member connected to the opposite end of its coil form, each of said interior ends including small projections to assist in positioning the pole piece secured thereto during assembly.

References Cited by the Examiner
UNITED STATES PATENTS

| | | | |
|---|---|---|---|
| 1,966,897 | 7/1934 | Lofgren | 310—164 |
| 2,274,957 | 3/1942 | Hansen et al. | 310—164 |
| 2,432,070 | 12/1947 | Sanborn | 310—164 |
| 2,512,848 | 6/1950 | Brouwer | 310—164 |
| 2,672,564 | 3/1954 | Krasno | 310—164 X |
| 2,804,557 | 8/1957 | Roters | 310—164 |
| 3,014,141 | 12/1961 | Riggs | 310—164 X |
| 3,092,743 | 6/1963 | Van Utt et al. | 310—162 |

FOREIGN PATENTS 1,021,943   1/1958   Germany.

ORIS L. RADER, *Primary Examiner.*

MILTON O. HIRSHFIELD, *Examiner.*